US008830522B2

(12) United States Patent
Mizuno

(10) Patent No.: US 8,830,522 B2
(45) Date of Patent: Sep. 9, 2014

(54) IMAGE FORMING APPARATUS, IMAGE FORMING METHOD, AND STORAGE MEDIUM

(75) Inventor: Yoshitake Mizuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/607,196

(22) Filed: Sep. 7, 2012

(65) Prior Publication Data

US 2013/0077105 A1 Mar. 28, 2013

(30) Foreign Application Priority Data

Sep. 22, 2011 (JP) ................................ 2011-207346

(51) Int. Cl.
*H04N 1/60* (2006.01)
*G03G 15/00* (2006.01)

(52) U.S. Cl.
CPC .................................. *G03G 15/5062* (2013.01)
USPC ............................ 358/1.9; 358/3.23; 358/518

(58) Field of Classification Search
None
See application file for complete search history.

(56) References Cited

U.S. PATENT DOCUMENTS 5,543,896 A * 8/1996 Mestha ........................... 399/49
2003/0048478 A1* 3/2003 Cheng et al. ................. 358/3.06
2006/0119874 A1* 6/2006 Kurihara ...................... 358/1.13

FOREIGN PATENT DOCUMENTS

JP 2010-176011 A 8/2010

* cited by examiner

*Primary Examiner* — Kimberly A Williams
(74) *Attorney, Agent, or Firm* — Canon USA, Inc., IP Division

(57) ABSTRACT

An image forming apparatus includes a forming unit configured to form an identical pattern on a plurality of pages of a recording material, a reading unit configured to read patterns on the plurality of pages formed by the pattern forming unit, a generation unit configured to generate a correction look-up table corresponding to each page by using the patterns on the plurality of pages, and a correction unit configured to correct output image data by using the correction look-up table corresponding to each page generated by the generation unit.

15 Claims, 14 Drawing Sheets

IMAGE FORMING APPARATUS, IMAGE FORMING METHOD, AND STORAGE MEDIUM

BACKGROUND OF THE INVENTION

1. Field of the Invention

The present invention relates to image forming apparatuses such as copying machines, particularly to image forming apparatuses configured to improve stability of an image quality by performing gradation correction processing.

2. Description of the Related Art

In conventional image forming apparatuses for recording monochromatic images and color images, the density of output images may become unstable as time passes due to various factors.

In an electro-photographic type image forming apparatus, for example, processing of laser exposure, latent image formation on a photosensitive member, toner development, toner transfer onto a paper medium, thermal fixing, and the like during electro-photographic processing are easily influenced by the surrounding temperature and humidity of the apparatus and the aging variation of component parts. Thus, the amount of toner that is eventually fixed onto the paper medium varies every time, which may result in unstable output density. Such an unstable condition in the output density arises not only on the electro-photographic type image forming apparatus, but also on the image forming apparatuses of various types such as an ink jet recording type and a thermal transfer type.

As a technique for improving the above-described density variation caused by the environmental factors (such as temperature and humidity), a technique of forming a gradation correction look-up table (LUT) unique to printers has been employed. In order to form the gradation correction LUT, firstly, a test chart on which a gradation pattern is printed is output, and a luminance signal of the gradation pattern printed on the test chart is read by a sensor. Thereafter, the luminance signal is transformed to a density signal through logarithm (LOG) transformation. The density signal acquired therefrom represents a density characteristic of the printer. Therefore, the gradation correction LUT is formed in such a manner that the density characteristic thereof becomes linear. When the above-described operation is performed, a system user (a user or a service person) operates an image forming apparatus according to the instruction from an operation unit, so that the image forming apparatus outputs a test chart. Then, the system user places the test chart on a document positioning plate. Further, by using a sensor that is disposed on a rear portion of a conveyance path from which the paper inside the image forming apparatus is discharged after toner being fixed thereon, the test chart that is output after passing through a fixing unit can be read automatically. This enables the gradation correction to be automatically performed without asking time and effort of the user.

The above-described environmental factors such as temperature and humidity may vary depending on the number of printing pages. For example, the temperature of the fixing unit has a characteristic in that the temperature is high at the time of starting, lowered every time the paper passes therethrough, and gradually stabilized when printing is performed consecutively. In addition, high temperature in the fixing unit results in high-gloss output, so that the printing density tends to be high. In other words, the density of the printing material that is output immediately after the start of printing can easily become high. Therefore, there is a high possibility that an image may not be output in an appropriate density.

In order to perform gradation correction while taking the above-described characteristics into consideration and assuming gradations in a stable condition as essential, above-described, a method may be employed in which a plurality of test charts is printed, and a last-output test chart having a stable gradation characteristic is read as a test chart to form a correction table.

With the above-described method, the gradation characteristic after the gradations have been stabilized can be corrected. However, in the method, a condition in which the gradation characteristic has not been stabilized for a period immediately after printing is actually started, is not taken into consideration. Therefore, output for a period when the gradation characteristic has not been stabilized is executed only by using the correction table whose gradation characteristic is different from the gradation characteristic for that period.

In order to deal with such variations in gradations depending on the number of printing pages from the start of printing, Japanese Patent Application Laid-Open No. 2010-176011 discusses a technique capable of making the output stable from the first printing page by applying the gradation correction according to the number of printing pages.

In the technique, a correction amount suitable for variations in development contrast caused by lowering of an electric potential according to the number of printing pages for a period of consecutive or intermittent printing, is acquired based on environmental sensor information.

Further, in the technique, a gradation correction table is controlled based on the acquired correction amount.

In the above-described technique discussed in Japanese Patent Application Laid-Open No. 2010-176011, the correction amount is always an approximate predictive correction amount based on the environmental sensor information. However, when printing target data is actually printed and output, there is an individual difference in each engine characteristic, and in addition, various types of recording media are used for printing. Accordingly, the correction amount acquired by scanning the gradation pattern, which is output to determine the correction amount with respect to the printing target data, may not be output at high precision.

SUMMARY OF THE INVENTION

According to an aspect of the present invention, an image forming apparatus includes a pattern forming unit configured to form an identical pattern on a plurality of pages of a recording material, a pattern reading unit configured to read patterns on the plurality of pages formed by the pattern forming unit, a correction look-up table generation unit configured to generate a correction look-up table corresponding to each page by using the patterns on the plurality of pages read by the pattern reading unit, and a correction unit configured to correct output image data by using the correction look-up table corresponding to each page generated by the correction look-up table generation unit.

According to an exemplary embodiment of the present invention, gradation patterns on a plurality of pages are output in a consecutive manner, and output results of all the gradation patterns are scanned. Thereafter, characteristics according to environmental variations are stored and reflected on gradation correction tables. This enables the gradation stability of the output printing material to be ensured from the first page thereof when the print output target data is actually printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 4:
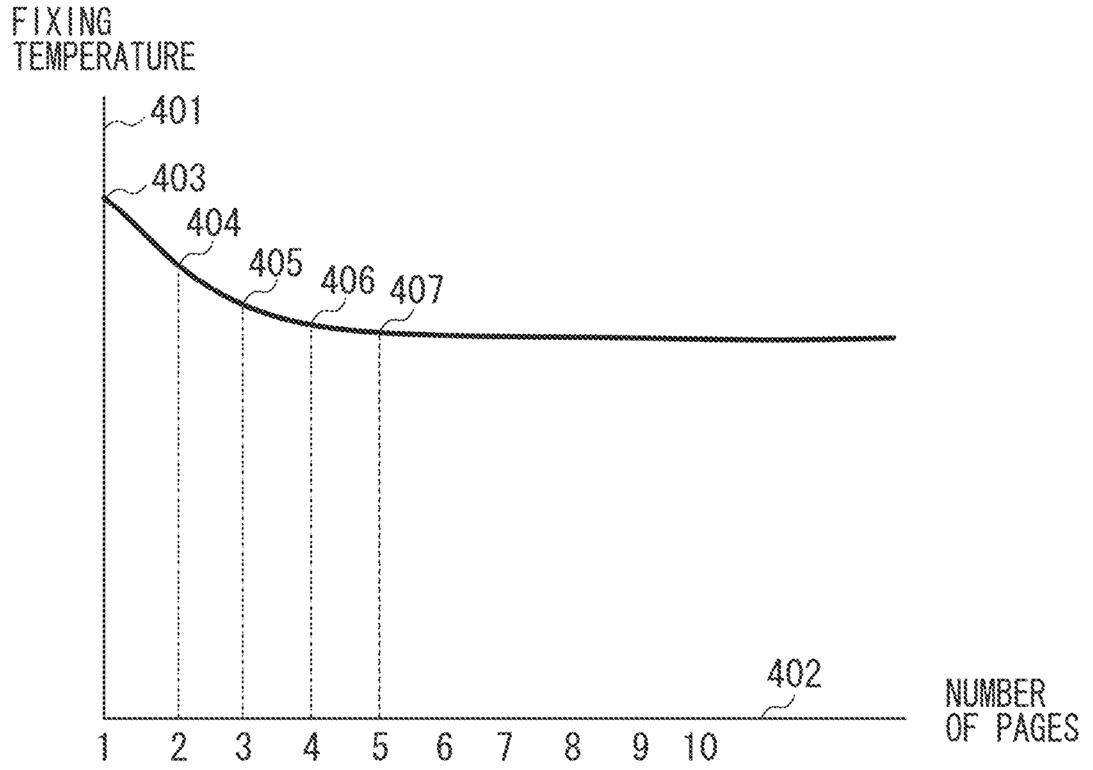
FIG. 4 is a graph illustrating a relationship between the number of output pages and fixing temperatures.

FIG. 4 is a graph illustrating a relationship between the number of output (printing) pages and fixing temperatures of the image forming apparatus according to the exemplary embodiments of the present invention. Pages of a recording material output in a consecutive manner and characteristics of the fixing temperatures are exemplified and described with reference to FIG. 4. The vertical axis 401 represents the fixing temperatures, and the horizontal axis 402 represents the pages output consecutively.

In a fixing unit, a temperature 403 for the first page is the highest. Then, the temperature is gradually lowered page by page in the order of a temperature 404 for the second page, a temperature 405 for the third page, a temperature 406 for the fourth page, a temperature 407 for the fifth page. Thereafter, the temperature of the fixing unit becomes stable partway through.

In the following exemplary embodiments, the image forming apparatus having the above-described relationship between the number of output pages and the fixing temperatures is exemplified.

In the first exemplary embodiment of the present invention, gradation patterns on a plurality of pages are output, and a correction LUT is generated with respect to each of the output pages. When image forming processing is performed practically, an image is printed after being corrected by using the correction LUT corresponding to the output page.

Figure 1:
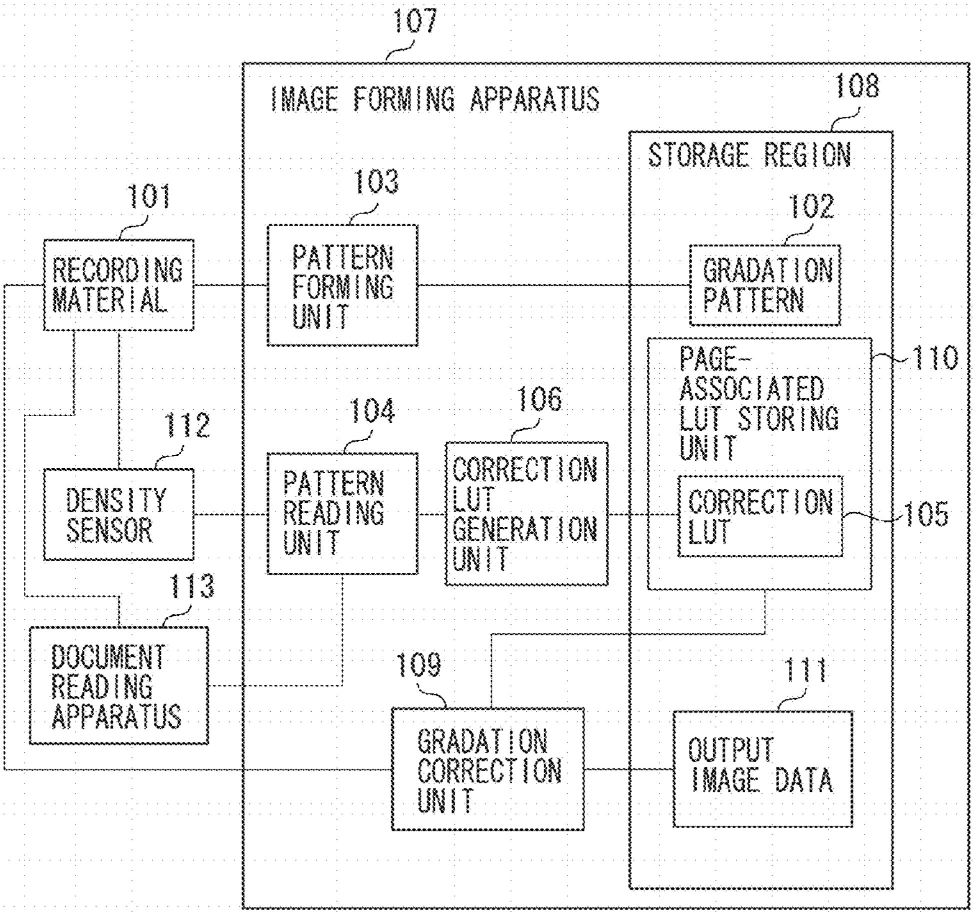
FIG. 1 is a block diagram illustrating a configuration of an image forming apparatus according to a first exemplary embodiment.

FIG. 1 is a block diagram illustrating a configuration of the image forming apparatus according to a first exemplary embodiment. General configuration and operations thereof will be described with reference to FIG. 1.

The configuration includes an image forming apparatus 107 which forms an image on a recording material 101 such as a sheet of paper. The image forming apparatus 107 realizes various kinds of functions by executing a program operating on a central processing unit (CPU).

A pattern forming unit 103 forms a gradation pattern 102 in a storage region 108 such as a synchronous dynamic random access memory (SDRAM) and a hard disk drive (HDD) when automatic gradation correction processing is carried out. The gradation pattern 102 formed thereby is printed on the recording material 101 after going through the processing of image processing such as half-tone processing, development, image transfer, and image fixation.

The image forming apparatus 107 forms, on the recording material 101, the gradation patterns 102 for a certain number of output pages specified by the user.

Then, the recording material 101 with the gradation pattern 102 printed thereon is placed on a document reading apparatus 113. When an instruction for scanning is input by a user, a pattern reading unit 104 scans the recording material 101 placed on a document positioning plate of the document reading apparatus 113, and measures the density of the gradation pattern 102 printed on the recording material 101. Herein, the configuration may be such that the recording material 101 is automatically read by a density sensor 112 or the like disposed on a conveyance path of the image forming apparatus 107 from which the paper is discharged after the toner is fixed thereon. After that, a correction LUT generation unit 106 generates a correction LUT 105 based on the measured density, and stores the correction LUT 105 in the storage region 108 such as the SDRAM and the HDD.

The image forming apparatus 107 assigns a page number (first page, second page, and so on) to each recording material 101 in the order of outputting the recording material 101 with the gradation patterns 102 respectively recorded thereon. Further, by reading the output recording material 101, the image forming apparatus 107 generates the correction LUT 105 corresponding to each page. Thereafter, the image forming apparatus 107 associates each correction LUT 105 with each page, and stores the correction LUT 105 in a page-associated LUT storing unit 110.

Figure 5:
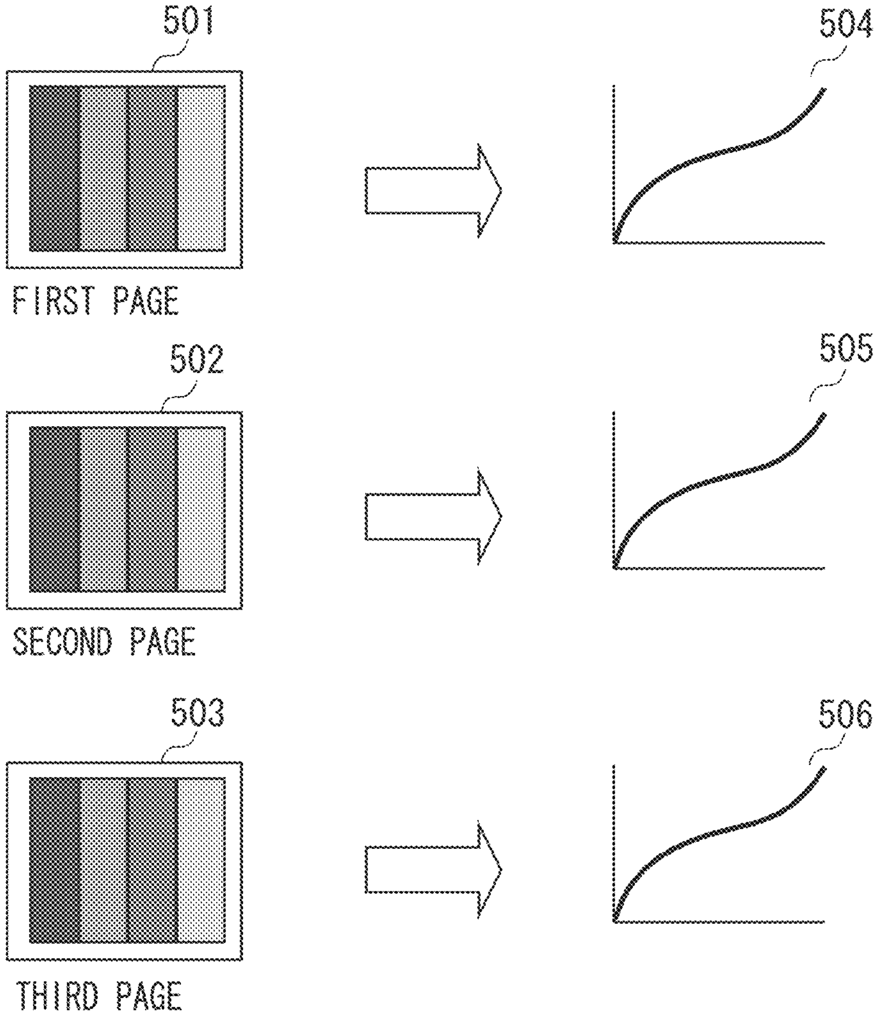
FIG. 5 is a data-flow diagram of the image forming apparatus according to the first exemplary embodiment.

When the image forming apparatus 107 actually performs image forming processing on the recording material 101 such as a sheet of paper, a gradation correction unit 109 performs correction processing on output-target output image data 111 stored in the storage region 108 by using the correction LUT 105 of the corresponding output page. After that, the image forming apparatus 107 further performs half-tone processing on the output image data 111 to form an image. The data-flow for which the printing is executed based on the above-described configuration is illustrated in FIG. 5.

In a case where the instruction for outputting three pages is provided when the gradation correction is performed, the image forming apparatus 107 outputs a gradation pattern 501 for the first output page, a gradation pattern 502 for the second output page, and a gradation pattern 503 for the third output page in a consecutive manner. Then, through the processing performed by the pattern reading unit 104 and the correction LUT generation unit 106, the image forming apparatus 107 generates a correction LUT 504 for the first output page, a correction LUT 505 for the second output page, and a correction LUT 506 for the third output page, and stores these correction LUTs 504 through 506 in the storage region 108.

When a plurality of consecutive pages is actually printed, the correction LUT 504 for the first output page is used to print the first page, the correction LUT 505 for the second output page is used to print the second page, and the correction LUT 505 for the third output page is used to print the third page, respectively.

Figure 9A:
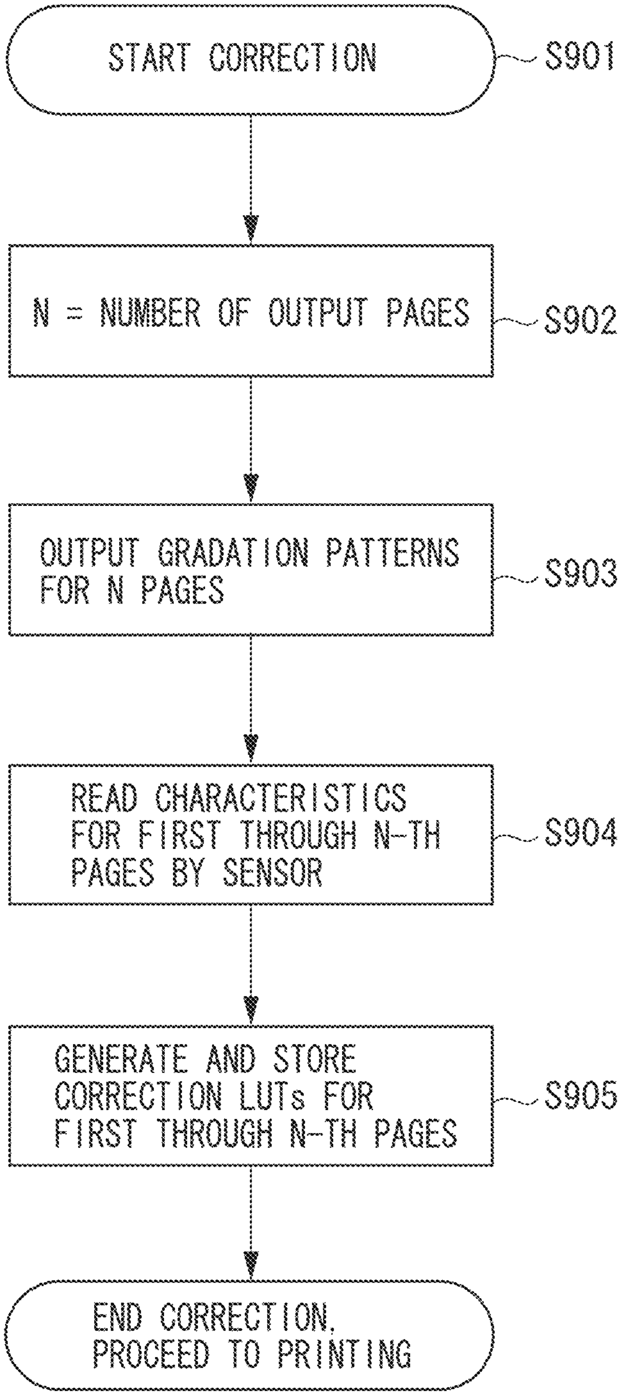
FIGS. 9A and 9B are flow charts of the image forming apparatus according to the first exemplary embodiment.
Figure 9B:
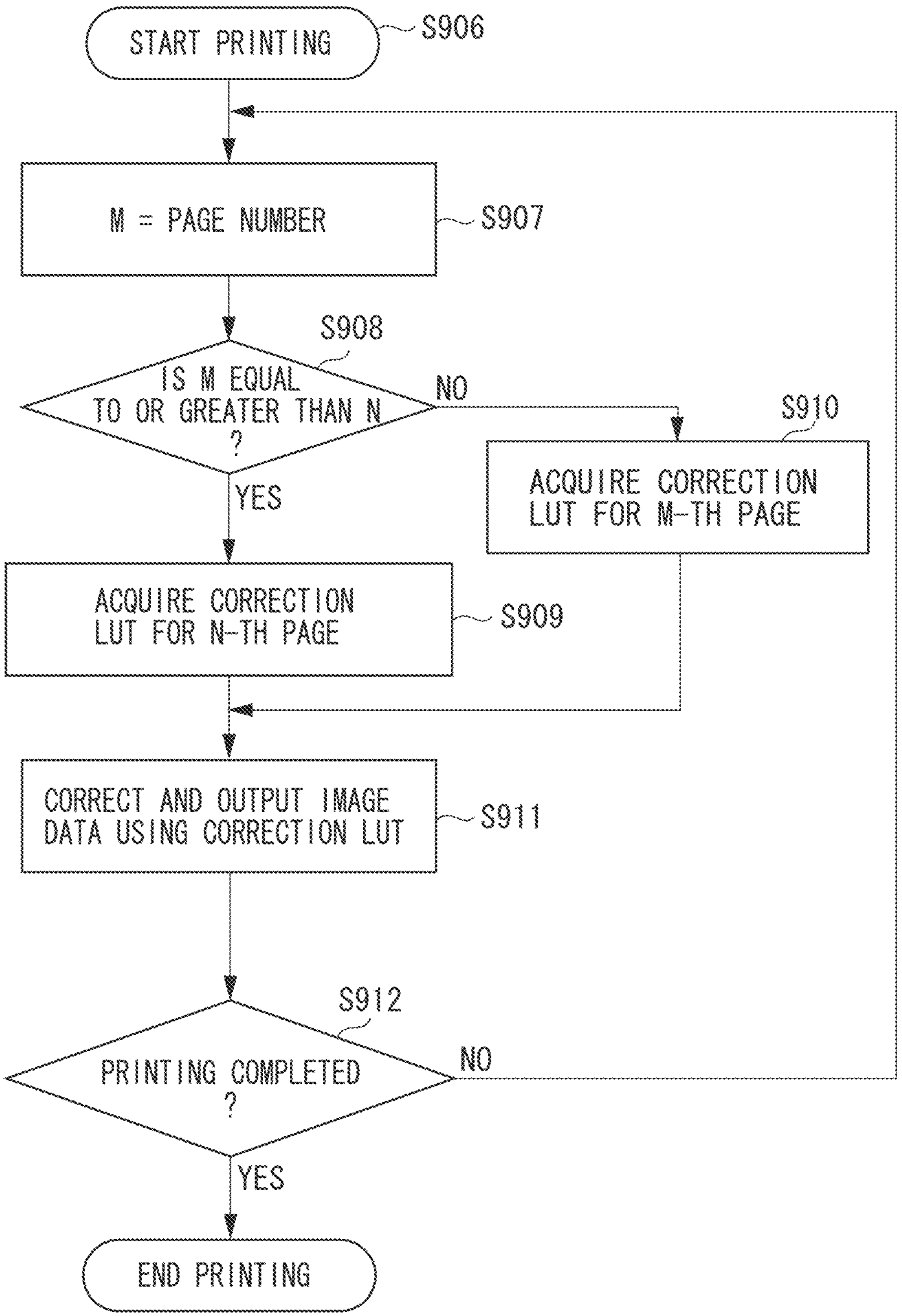

FIGS. 9A and 9B are flow charts of the image forming apparatus according to the first present exemplary embodiment.

In the present exemplary embodiment, a program relating to the processing described in the flow charts is stored in a storage unit (not illustrated) of the image forming apparatus 107. This program is read in a random access memory (RAM) which is not illustrated, so as to be executed by the CPU (not illustrated).

First, a flow in which the image forming apparatus 107 updates the correction table is described with reference to FIG. 9A. In step S901, correction processing is started.

In step S902, the image forming apparatus 107 stores specified number of output pages "N". Then, in step S903, the image forming apparatus 107 prints and outputs the gradation patterns for the specified N-pages. In this manner, the image forming apparatus 107 consecutively prints and outputs gradation patterns on a plurality of pages through a single series of correction processing.

Next, in step S904, the image forming apparatus 107 causes the density sensor 112 and the pattern reading unit 104 to read characteristics of the gradation patterns of the first through N-th pages.

Further, in step S905, the image forming apparatus 107 generates the correction LUTs for the first through N-th pages, and stores the correction LUTs thereof in the storage region 108. Thereafter, the image forming apparatus 107 completes the correction processing.

Next, a flow in which the image forming apparatus 107 executes printing is described with reference to FIG. 9B. In step S906, printing processing is started.

In step S907, the image forming apparatus 107 stores a current page number "M".

In step S908, the image forming apparatus 107 determines whether the page number "M" is equal to or greater than "N". If the page number "M" is equal to or greater than "N" (YES in step S908), then in step S909, the image forming apparatus 107 acquires a correction LUT for the N-th page.

If the page number "M" is less than "N" (NO in step S908), then in step S910, the image forming apparatus 107 acquires a correction LUT for the M-th page.

Next, in step S911, the image forming apparatus 107 makes correction on image data using the acquired correction LUT, and outputs the image data thereafter.

In step S912, the image forming apparatus 107 determines whether to print the next page continuously. If the printing processing is not completed (NO in step S912), the processing proceeds to step S907. If the printing processing is completed (YES in step S912), the image forming apparatus 107 completes the printing processing.

Figure 8:
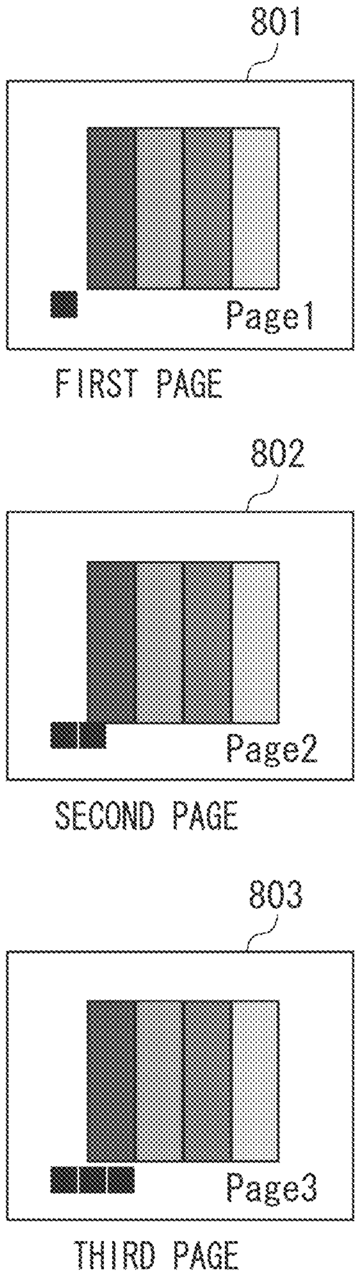
FIG. 8 is a diagram illustrating images of patterns that are output on a plurality of pages from the image forming apparatus according to the first exemplary embodiment.

FIG. 8 is a diagram illustrating the images of patterns that are output on a plurality of pages from the image forming apparatus.

The pattern forming unit 103 records an identical gradation pattern on a gradation pattern reading area of each page of the recording medium 101 when a plurality of pages is output. In addition, the pattern forming unit 103 records a certain pattern for each page such as a mark on a non-reading area of the recording medium 101, so that each page of the recording medium 101 can be identified. For example, on a first page 801, the pattern forming unit 103 prints either a black square mark or text such as "Page 1" which identifies the first page 801 from among the others. Further, on a second page 802, for example, the pattern forming unit 103 prints either two black square marks or text such as "Page 2" which identifies the second page 802 from among the others. Likewise, on a third page 803, for example, the pattern forming unit 103 prints either three black square marks or text such as "Page 3" which identifies the third page 803 from among the others. This can clearly define in what order the gradation patterns are output on the respective recording media 101.

In the present exemplary embodiment, the description has been given while focusing on the LUT for making correction on gradations. However, the present exemplary embodiment can also be applied to the correction of other characteristics such as color. In addition, the configuration for realizing the correction is not limited to the LUT, and function and matrix may as well be employed. Therefore, in the present exemplary embodiment, the LUT, the function, the matrix, and so on are collectively called as "correction characteristics".

As described above, the image forming apparatus 107 according to the present exemplary embodiment prints and outputs a plurality of gradation patterns in a consecutive manner, scans output results of every gradation patterns, and forms the gradation correction tables. With this, when the printing material is actually output, the gradation correction tables corresponding to the output order of pages of the printing material can be used. This enables the gradation stability to be ensured for each page when the printing is executed.

In a second exemplary embodiment of the present invention, a correction LUT for an arbitrary page is generated from a correction LUT corresponding to a specified page and difference in reading characteristics of the arbitrary page and the specified page. Then, printing is performed after making correction on the arbitrary page.

Figure 2:
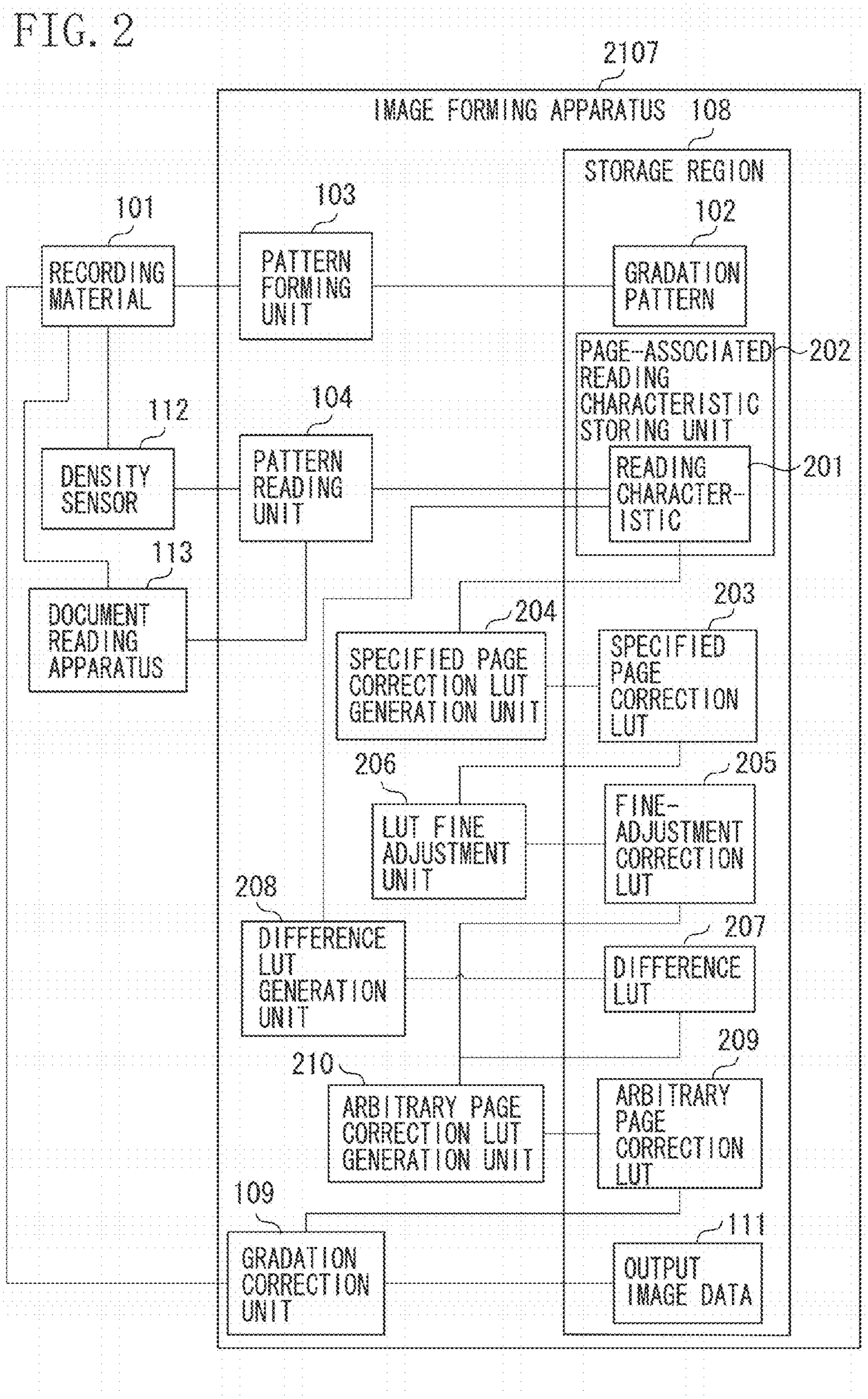
FIG. 2 is a block diagram illustrating a configuration of an image forming apparatus according to a second exemplary embodiment.

FIG. 2 is a block diagram illustrating a configuration of an image forming apparatus according to the present exemplary embodiment.

Herein, differences between the first and the present exemplary embodiments are mainly described whereas the description on the elements and the configuration which are already described and are common to the first exemplary embodiment will be either omitted or given in a simplified manner.

The image forming apparatus 2107 stores a page-associated reading characteristic 201 read by the pattern reading unit 104 in a page-associated reading characteristic storing unit 202.

A specified page correction LUT generation unit 204 calculates a correction LUT from the reading characteristic 201 for the last page of the recording material 101 on which the gradation patterns are output, and stores that correction LUT as a specified page correction LUT 203.

At this time, the specified page correction LUT generation unit 204 may calculate the correction LUT from the reading characteristic 201 for the page that is specified separately, instead of calculating from that of the last page of the recording material 101, and may store that correction LUT as the specified page correction LUT 203.

In order to correct the image forming characteristics to be the latest image forming characteristic corresponding to changes in the environmental condition such as power ON/OFF, specified number of output pages, specified elapsed time, and temperature and humidity, as well as user instructions, an LUT fine adjustment unit 206 makes fine adjustment on the specified page correction LUT 203, and generates a fine-adjustment correction LUT 205.

When the output image data 111 serving as printing target image data is output to the recording material 101, a difference LUT generation unit 208 acquires the reading characteristics 201 of the output page and the specified page, and generates a difference LUT 207.

An arbitrary page correction LUT generation unit 210 generates an arbitrary page correction LUT 209 from the fine-adjustment correction LUT 205 and the difference LUT 207, and stores the arbitrary page correction LUT 209 to serve as a correction LUT for the output page.

The image forming apparatus 2107 causes the gradation correction unit 109 to perform correction processing on the output image data 111 by using the arbitrary page correction LUT 209 corresponding to the output page. The output image data 111 is targeted for outputting on the recording material 101 such as a sheet of paper, and is stored in the storage region 108. After that, the image forming apparatus 2107 performs half-tone processing on that output image data 111 to form an image.

Figure 6:
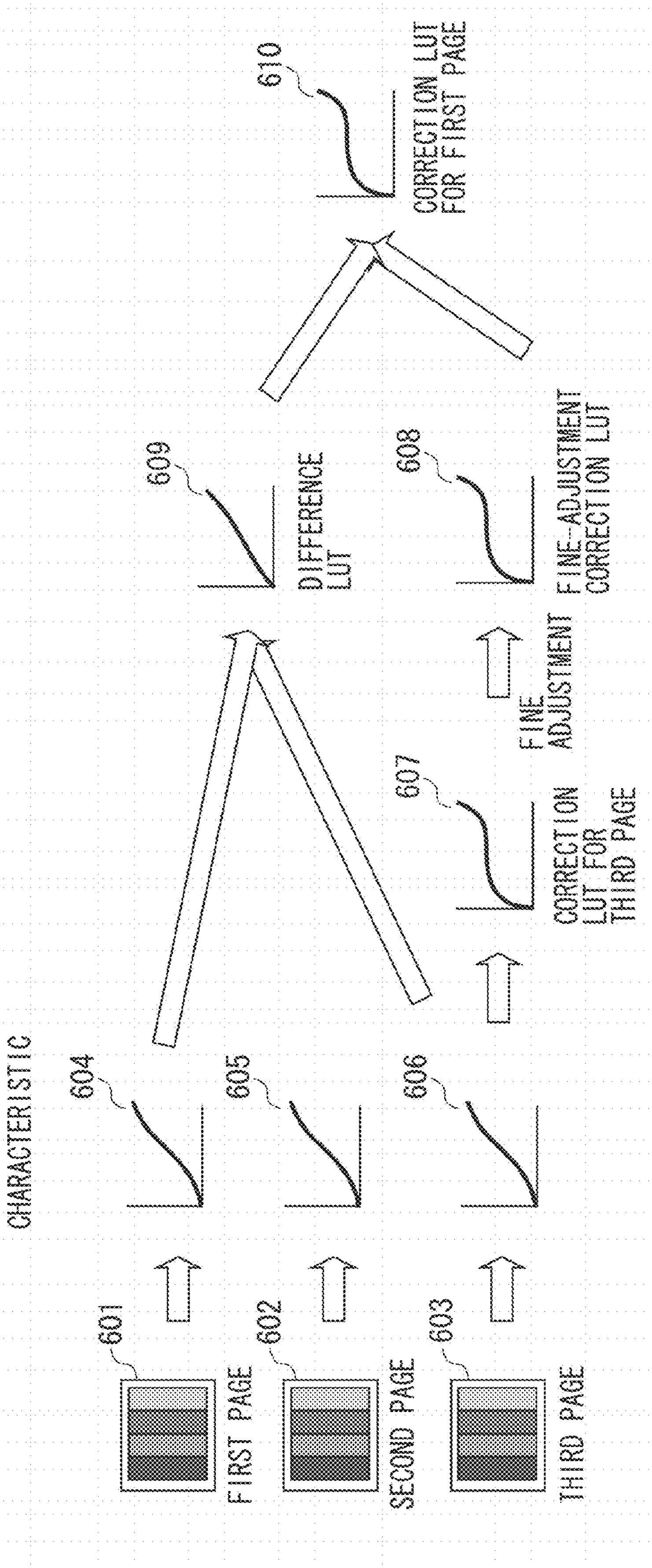
FIG. 6 is a data-flow diagram of the image forming apparatus according to the second exemplary embodiment.

The data-flow for which the printing is executed based on the above-described configuration is illustrated in FIG. 6. FIG. 6 is a data-flow diagram of the image forming apparatus according to the present exemplary embodiment.

In a case where the instruction for outputting three pages is provided when the gradation correction is performed, the image forming apparatus 2107 outputs a gradation pattern 601 for the first output page, a gradation pattern 602 for the second output page, and a gradation pattern 603 for the third output page in a consecutive manner. As illustrated in FIG. 8, a mark for identifying each gradation pattern is printed on each of the gradation patterns 601 through 603. The image forming apparatus 2107 causes the pattern reading unit 104 to store a characteristic 604 for the first output page, a characteristic 605 for the second output page, and a characteristic 606 for the third output page in the storage region 108.

The specified page correction LUT generation unit 204 calculates a correction LUT 607 for the third page from the reading characteristic 606 for the third page serving as a last page of the output recording material 101. Then, the specified page correction LUT generation unit 204 stores the correction LUT 607 as a specified page correction LUT 203, and does not generate the correction LUTs for rest of the pages.

In order to correct the image forming characteristics to be the latest image forming characteristic corresponding to changes in the environmental condition such as power ON/OFF, specified number of output pages, specified elapsed time, temperature and humidity, and user instructions, the LUT fine adjustment unit 206 makes fine adjustment on the correction LUT 607 for the third page, and generates a fine-adjustment correction LUT 608 for the third page.

When the output image data 111 is output to the recording material 101, and if this is the output for the first page, for example, the difference LUT generation unit 208 acquires the characteristic 604 for the first page and the characteristic 606 for the third page, and generates a difference LUT 609.

The arbitrary page correction LUT generation unit 210 generates a correction LUT 610 for the first page from the fine-adjustment correction LUT 608 for the third page and the difference LUT 609.

Figure 10A:
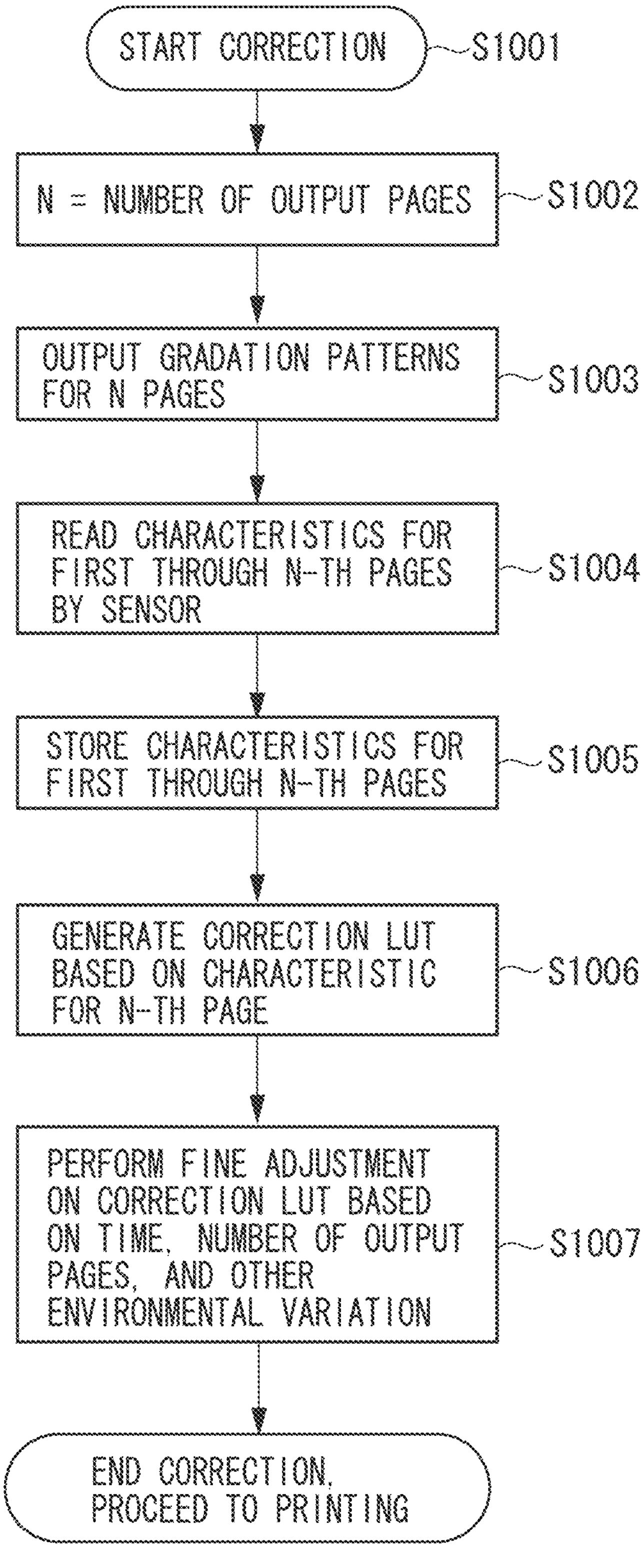
FIGS. 10A and 10B are flow charts of the image forming apparatus according to the second exemplary embodiment.
Figure 10B:
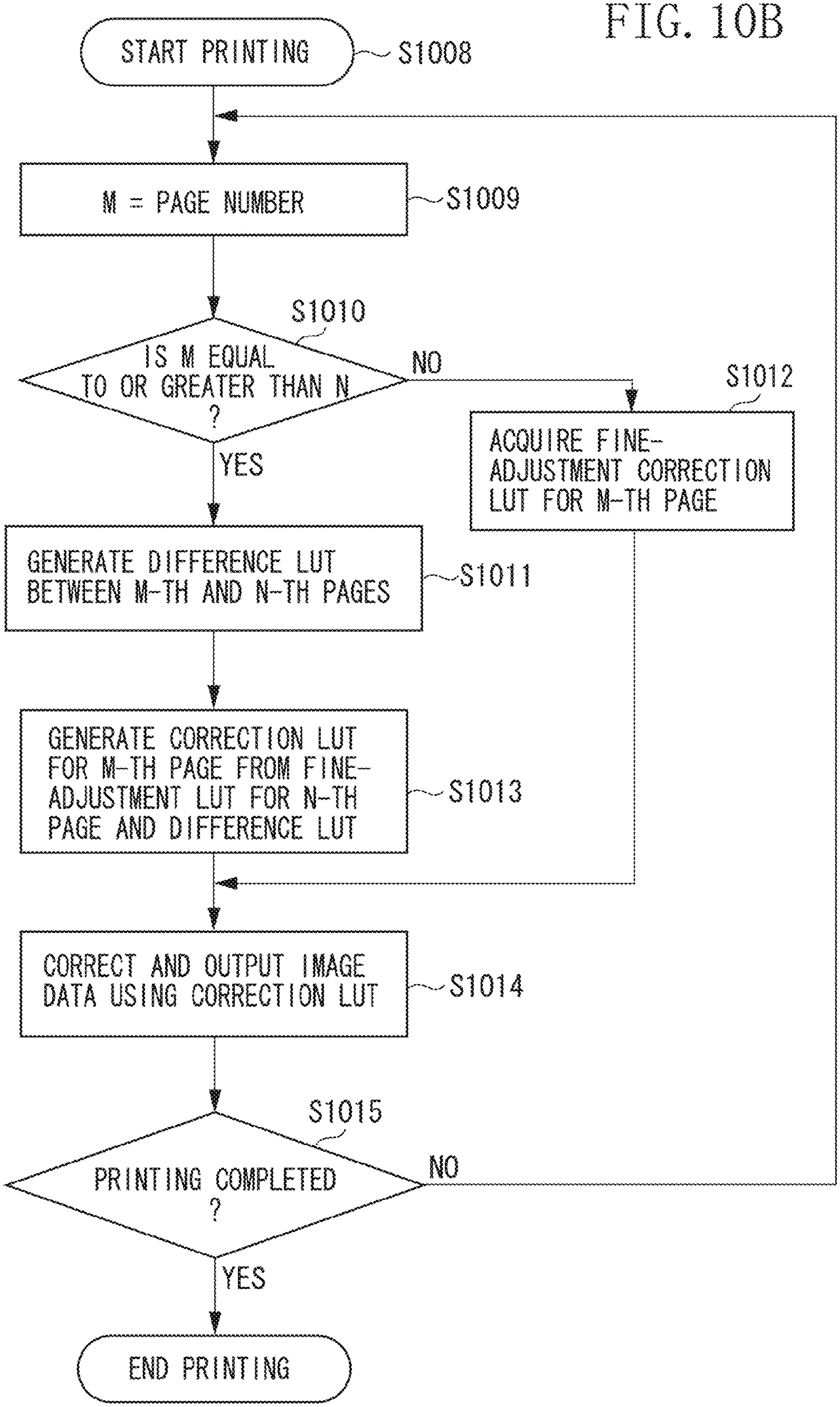

FIGS. 10A and 10B are flow charts of the image forming apparatus according to the present exemplary embodiment.

In the present exemplary embodiment, a program which relates to the processing illustrated in the flow charts is stored in a storage unit (not illustrated) of the image forming apparatus 2107. This program is read in a RAM (not illustrated), so as to be executed by a CPU (not illustrated).

First, a flow in which the image forming apparatus 2107 updates the correction table is described with reference to FIG. 10A. In step S1001, the correction processing is started.

In step S1002, the image forming apparatus 2107 stores the specified number of output pages "N".

Next, in step S1003, the image forming apparatus 2107 outputs gradation patterns for the specified N-pages. In this manner, the image forming apparatus 2107 consecutively prints and outputs gradation patterns on a plurality of pages through a single series of correction processing.

In step S1004, the image forming apparatus 2107 causes the density sensor 112 and the pattern reading unit 104 to read characteristics of the gradation patterns of the first through N-th pages.

In step S1005, the image forming apparatus 2107 stores the characteristics for the first through N-th pages in the storage region 108.

In step S1006, the image forming apparatus 2107 generates a correction LUT based on the characteristic for the N-th page, and stores that correction LUT.

In step S1007, in order to correct changes in the output characteristic of the image forming apparatus 2107 caused by elapsed time, number of output pages, and other environmental variations, the image forming apparatus 2107 makes fine adjustment on the correction LUT, and stores that correction LUT.

Next, a flow in which the image forming apparatus 2107 executes printing is described with reference to FIG. 10B. In step S1008, the printing processing is started.

In step S1009, the image forming apparatus 2107 stores a current page number "M".

In step S1010, the image forming apparatus 2107 determines whether the page number "M" is equal to or greater than "N".

If the page number "M" is equal to or greater than "N" (YES in step S1010), then in step S1011, the image forming apparatus 2107 generates a difference LUT for the difference between the M-th page and the N-th page.

Next, in step S1013, the image forming apparatus 2107 generates and acquires a correction LUT for the M-th page from the fine-adjustment correction LUT for the N-th page and the difference LUT.

If the page number "M" is less than "N" (NO in step S1010), then in step S1012, the image forming apparatus 2107 acquires a fine-adjustment correction LUT for the M-th page.

In step S1014, the image forming apparatus 2107 makes correction on image data using the acquired correction LUT, and outputs the image data thereafter.

In step S1015, the image forming apparatus 2107 determines whether to print the next page continuously. If the printing processing is not completed (NO in step S1015), the processing proceeds to step S1009. If the printing processing is completed (YES in step S1015), the image forming apparatus 2107 completes the printing processing.

In the present exemplary embodiment, the description has been given while focusing on the LUT for making correction on gradations. However, the present exemplary embodiment can also be applied to the correction of other characteristics such as color.

As described above, the image forming apparatus 2107 according to the present exemplary embodiment outputs a plurality of gradation patterns in a consecutive manner, scans the output results of every gradation patterns to store the characteristics thereof, generates only the correction LUT for the specified page, and further generates the correction LUT for the arbitrary page based on the correction LUT for the specified page. With this, when the printing material is actually output, gradation correction tables corresponding to the output order of pages of the printing material can be used. This enables the gradation stability to be ensured for each page when printing is executed.

Further, generating only the specified page correction LUT can save resources such as memory in comparison to the case where the correction LUT is generated for each page.

In a third exemplary embodiment, a characteristic for a period of reading each page on which a pattern is printed and environmental information for the period thereof are stored while making the characteristic and the environmental information thereof be associated with each other. Further, when an image is actually formed, environmental information for a period of forming the image is acquired. Then, a correction LUT corresponding to the acquired environmental information is generated from the stored environmental information and the reading characteristic, and thus, printing is executed after making correction on the output page.

Figure 3:
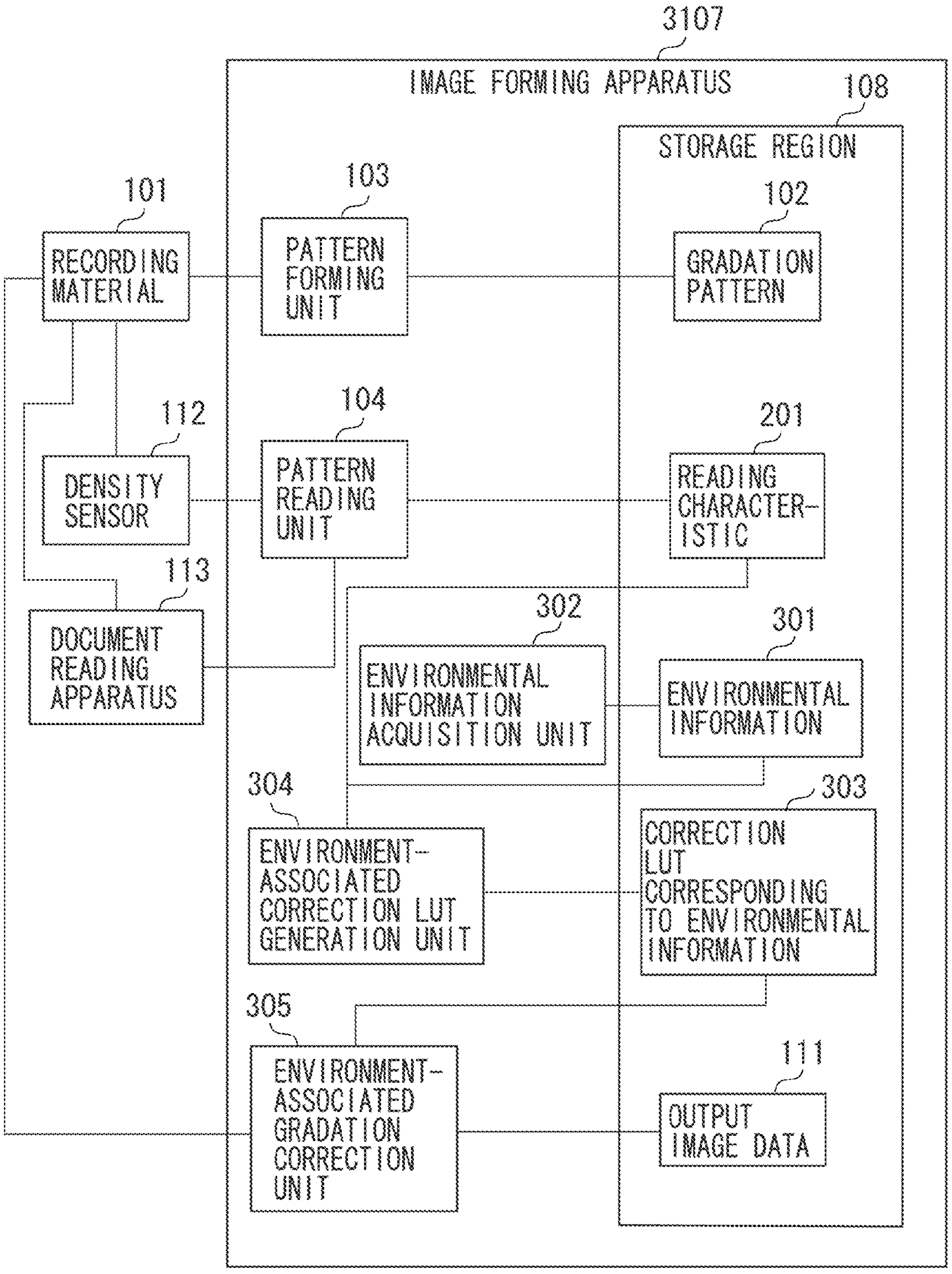
FIG. 3 is a block diagram illustrating a configuration of an image forming apparatus according to a third exemplary embodiment.

FIG. 3 is a block diagram illustrating a configuration of an image forming apparatus according to the present exemplary embodiment.

Herein, differences between the first and second exemplary embodiments and the present exemplary embodiment are mainly described, whereas the description on the elements and the configuration which are already described and are common to the first and second exemplary embodiments will be either omitted or given in a simplified manner.

During the period when the pattern reading unit 104 stores the reading characteristic 201, an environmental information acquisition unit 302 stores environmental information 301 for that period in the storage region 108.

The term "environmental information" described in the present exemplary embodiment denotes the information relating to environmental factors such as temperature of a fixing unit. This environmental information can be acquired by the image forming apparatus, and has an influence on the image forming processing.

An environment-associated correction LUT generation unit 304 generates a correction LUT 303 corresponding to arbitrary environmental information from the reading characteristic 201 and the environmental information 301 corresponding thereto.

When an image of the output image data 111 is formed on the recording material 101, the environment-associated gradation correction unit 305 acquires environmental information through the processing performed by the environmental information acquisition unit 302, and causes the environment-associated correction LUT generation unit 304 to generate the correction LUT 303 corresponding to the environmental information. Further, the environment-associated gradation correction unit 305 performs correction processing using the correction LUT 303 corresponding to the environmental information which is generated by the environment-associated correction LUT generation unit 304. Thereafter, the environment-associated gradation correction unit 305 forms an image by performing half-tone processing on the image of the output data 111.

Figure 7:
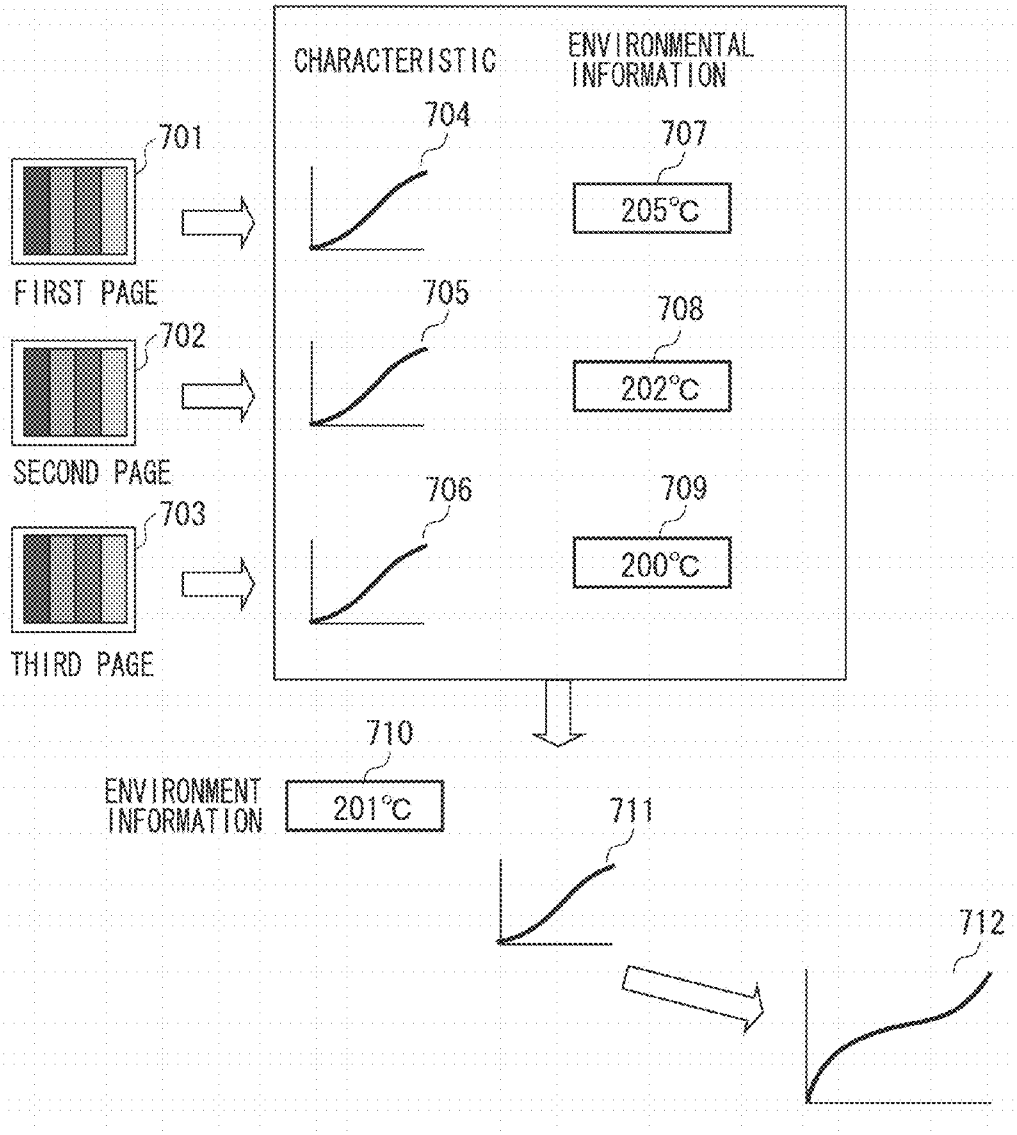
FIG. 7 is a data-flow diagram of the image forming apparatus according to the third exemplary embodiment.

FIG. 7 is a data-flow diagram of the image forming apparatus according to the present exemplary embodiment.

In a case where the instruction for outputting three pages is provided when the gradation correction is performed, the image forming apparatus 3107 outputs a gradation pattern 701 for the first output page, a gradation pattern 702 for the second output page, and a gradation pattern 703 for the third output page in a consecutive manner. As illustrated in FIG. 8, a mark for identifying each gradation pattern is printed on each of the gradation patterns 701 through 703. The image forming apparatus 3107 causes the pattern reading unit 104 to store characteristic 704 for the first output page, a characteristic 705 for the second output page, and a characteristic 706 for the third output page in the storage region 108.

At this time, the environmental information acquisition unit 302 stores environmental information 707 for the first output page, environmental information 708 for the second output page, and environmental information 709 for the third output page in the storage region 108 as corresponding environmental information.

When an image of the output image data 111 is formed on the recording material 101, the environment-associated gradation correction unit 305 acquires environmental information 710 through the processing performed by the environmental information acquisition unit 302. Further, the environment-associated gradation correction unit 305 causes the environment-associated correction LUT generation unit 304 to generate a correction LUT 712 corresponding to the environmental information 710.

The environment-associated correction LUT generation unit 304 predicts a characteristic 711 corresponding to the environmental information 710 based on the characteristics 704 through 706 and the corresponding environmental information 707 through 709, so as to generate a correction LUT 712 corresponding thereto.

In order to predict the characteristic 711, the environment-associated correction LUT generation unit 304 sets the characteristic data 704, 705, and 706 as a plurality of input points (on a horizontal axis). Further, the fixing temperature is linearly interpolated with output values, so that the output corresponding to the environmental information 710 can be acquired from the result of linear interpolation. After that, the values thereof are set as outputs of the respective input points, so that the characteristic 711 corresponding to the environmental information 710 can be predicted.

Figure 11A:
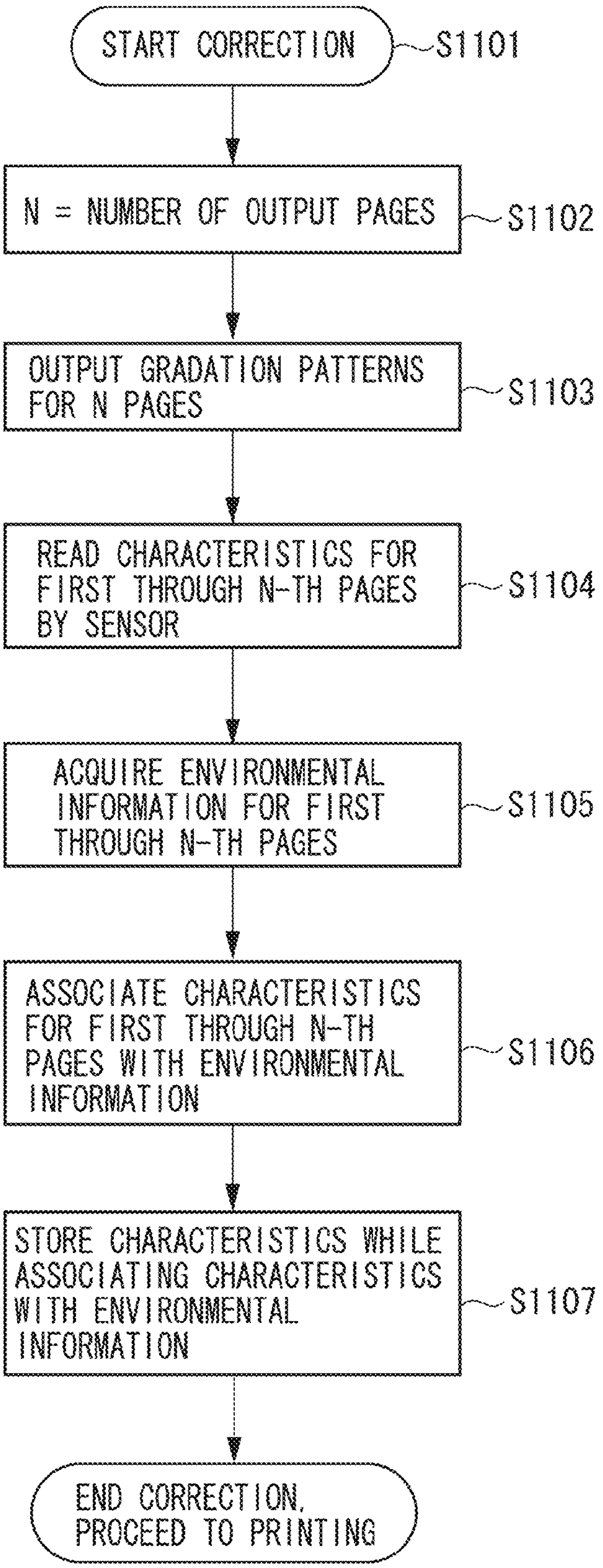
FIGS. 11A and 11B are flow charts of the image forming apparatus according to the third exemplary embodiment.
Figure 11B:
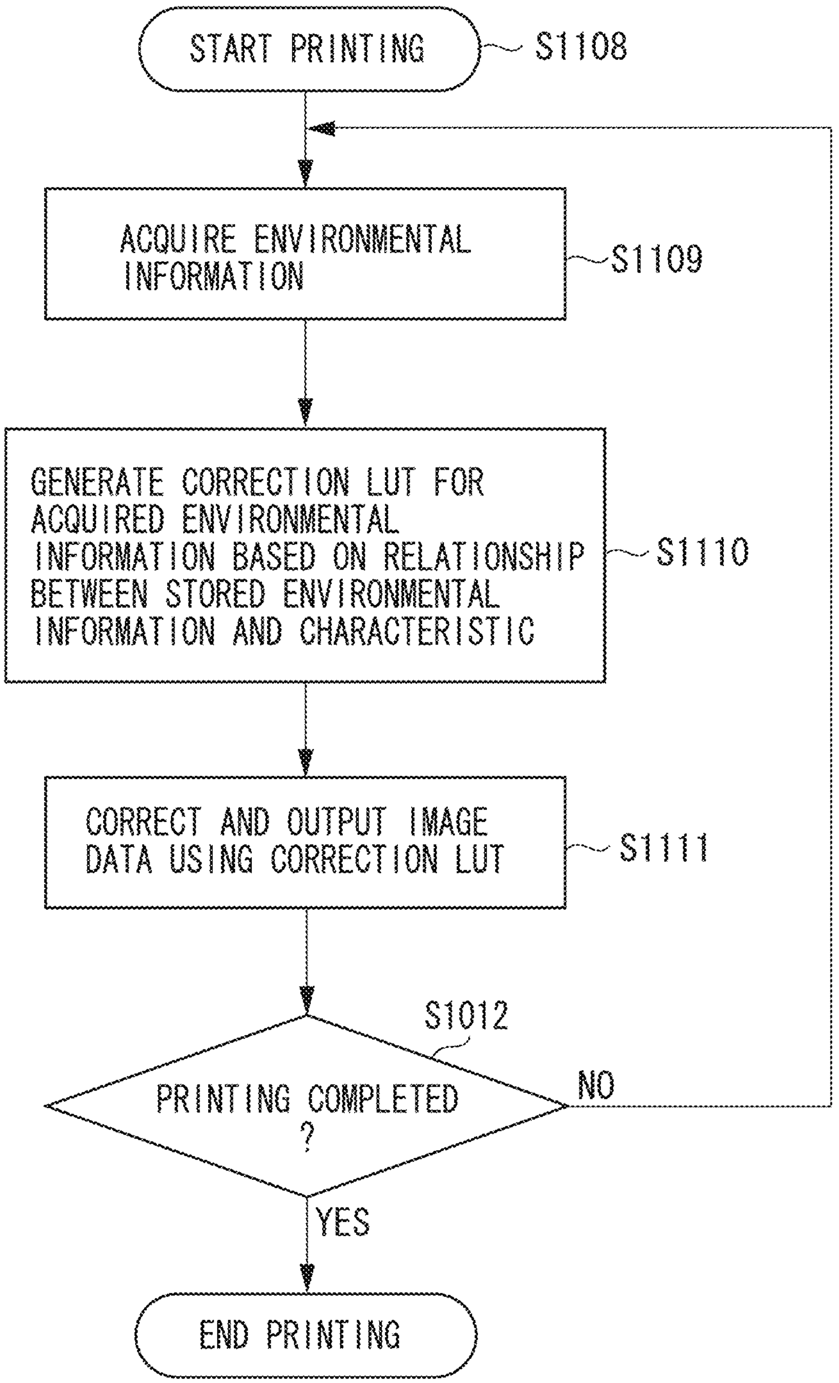

FIGS. 11A and 11B are flow charts of the image forming apparatus according to the present exemplary embodiment.

In the present exemplary embodiment, a program which relates to the processing illustrated in the flow charts is stored in a storage unit (not illustrated) of the image forming apparatus 3107. This program is read in a RAM (not illustrated), so as to be executed by a CPU (not illustrated).

First, a flow in which the image forming apparatus 3107 updates the correction table is described with reference to FIG. 11A. In step S1101, the correction processing is started.

In step S1102, the image forming apparatus 3107 stores the specified number of output pages "N".

Then, in step S1103, the image forming apparatus 3107 outputs gradation patterns for the specified N-pages. In this manner, the image forming apparatus 3107 consecutively prints and outputs gradation patterns on a plurality of pages through a single series of correction processing.

In step S1104, the image forming apparatus 3107 causes the density sensor 112 and the pattern reading unit 104 to read characteristics of the first through N-th pages.

In step S1105, the image forming apparatus 3107 acquires environmental information for the output period of the first through N-th pages.

Next, in step S1106, the image forming apparatus 3107 associates the environmental information for the output period of the first through N-th pages with the reading characteristics thereof.

In step S1107, the image forming apparatus 3107 stores the environmental information for the output period of the first through N-th pages and the reading characteristic thereof while making the environmental information and the reading characteristic thereof be associated with each other.

Next, a flow in which the image forming apparatus 3107 executes printing is described with reference to FIG. 11B. In step S1108, the printing processing is started.

In step S1109, the image forming apparatus 3107 acquires a current environmental information.

In step S1110, the image forming apparatus 3107 generates a correction LUT corresponding to the acquired environmental information based on the relationship between the stored environmental information and reading characteristic.

In step S1111, the image forming apparatus 3107 makes correction on image data using the generated correction LUT, and outputs the image data thereafter.

In step S1112, the image forming apparatus 3107 determines whether to print the next page continuously. If the printing processing is not completed (NO in step S1112), the processing proceeds to step S1109. If the printing processing is completed (YES in step S1112), the image forming apparatus 3107 completes the printing processing.

In the present exemplary embodiment, the description has been given while focusing on the LUT for making correction on gradations. However, the present exemplary embodiment can also be applied to the correction of other characteristics such as color.

As described above, the image forming apparatus 3107 according to the present exemplary embodiment outputs a plurality of gradation patterns in a consecutive manner, scans the output results of every gradation patterns to store the characteristics corresponding to the environmental variation, and reflects that characteristics on the gradation correction table.

With this, when the printing material is actually output, the gradation correction tables corresponding to the environment for an output period of the printing material can be used. This enables the gradation stability to be ensured for each page.

In addition, generating only a correction LUT for the output page can save resources such as memory in comparison to the case where the correction LUT is generated for each page.

Further, when the correction LUT for an arbitrary page is generated, the correction LUT is generated based on the stored environmental information. Therefore, the correction LUT suitable for the temperature of the fixing unit for the output period can be generated.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-207346 filed Sep. 22, 2011, which is hereby incorporated by reference herein in its entirety.

What is claimed is:

1. An image forming apparatus comprising:

a forming unit configured to form an identical pattern on a plurality of pages of a recording material;

a reading unit configured to read formed patterns on the plurality of pages;

a storing unit configured to store a reading characteristic corresponding to each read page;

a first generation unit configured to generate a first page correction look-up table for correcting a characteristic of a first page using a reading characteristic of the first page from among the stored reading characteristics;

a second generation unit configured to generate a second page correction look-up table for correcting a characteristic of a second page different from the first page using differences between the reading characteristic of the first page and a reading characteristic of the second page; and a correction unit configured to perform correction on the second page of image data as an output target using the second page correction look-up table generated by the second generation unit.

2. The image forming apparatus according to claim 1, wherein fine adjustment is made on the second page correction look-up table according to changes in an environmental condition.

3. The image forming apparatus according to claim 1 further comprising:

an acquisition unit configured to acquire environmental information for a period in which the forming unit forms the identical pattern on the plurality of pages of the recording material; and a third generation unit configured to generate a correction look-up table corresponding to environmental information by using the environmental information acquired by the acquisition unit and reading characteristics of on the plurality of pages, wherein the correction unit acquires, from the third generation unit, the correction look-up table corresponding to the environmental information for a period of forming output image data, and performs correction on the output image data.

4. The image forming apparatus according to claim 1, wherein the reading unit reads a pattern formed by the forming unit by a sensor disposed on a conveyance path for the recording material on which the pattern is formed.

5. The image forming apparatus according to claim 1, wherein the forming unit prints an image for identifying each page on the recording material.

6. An image forming method comprising:

forming an identical pattern on a plurality of pages of a recording material;

reading the formed patterns on the plurality of pages;

storing a reading characteristic corresponding to each read page;

generating a first page correction look-up table for correcting a characteristic of a first page using a reading characteristic of the first page from among the stored reading characteristics;

generating a second page correction look-up table for correcting a characteristic of a second page different from the first page using differences between the reading characteristic of the first page and a reading characteristic of the second page; and performing correction on the second page of image data as an output target using the generated second page correction look-up table.

7. The image forming method according to claim 6 further comprising:

making fine adjustment on the second page correction look-up table according to changes in an environmental condition.

8. The image forming method according to claim 6 further comprising:

acquiring environmental information for a period when the identical patterns is formed on to the plurality of pages of the recording material;

generating a correction look-up table corresponding to environmental information by using the acquired environmental information for the output period of each page and the stored reading characteristics of the patterns the plurality of pages; and making correction on the output image data by acquiring the correction look-up table corresponding to environmental information for a period of forming the output image data.

9. The image forming method according to claim 6 further comprising:

reading the formed pattern by a sensor disposed on a conveyance path for the recording material on which the pattern is formed.

10. The image forming method according to claim 6 further comprising:

printing an image for identifying each page on the recording material.

11. A non-transitory computer-readable storage medium storing a computer program for controlling a computer to execute the image forming method according to claim 6.

12. The non-transitory computer-readable storage medium according to claim 11 further comprising:

making fine adjustment on the second page correction look-up table according to changes in an environmental condition.

13. The non-transitory computer-readable storage medium according to claim 11 further comprising:

acquiring environmental information for a period when the identical patterns is formed on the plurality of pages of the recording material;

generating a correction look-up table corresponding to environmental information by using the acquired environmental information and the stored reading characteristics of the plurality of pages; and making correction on the output image data by acquiring the correction look-up table corresponding to environmental information for a period of forming the output image data.

14. The non-transitory computer-readable storage medium according to claim 11 further comprising:

reading the formed pattern by a sensor disposed on a conveyance path for the recording material on which the pattern is formed.

15. The non-transitory computer-readable storage medium according to claim 11 further comprising:

printing an image for identifying each page on the recording material.

* * * * *